United States Patent
Kang et al.

(10) Patent No.: US 9,479,693 B2
(45) Date of Patent: Oct. 25, 2016

(54) METHOD AND MOBILE TERMINAL APPARATUS FOR DISPLAYING SPECIALIZED VISUAL GUIDES FOR PHOTOGRAPHY

(71) Applicant: Samsung Electronics Co., Ltd., Gyeonggi-do (KR)

(72) Inventors: Myungsu Kang, Seoul (KR); Jaewan Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 35 days.

(21) Appl. No.: 14/164,386

(22) Filed: Jan. 27, 2014

(65) Prior Publication Data

US 2014/0226052 A1    Aug. 14, 2014

(30) Foreign Application Priority Data

Feb. 8, 2013 (KR) .................. 10-2013-0014491

(51) Int. Cl.
*H04N 5/232* (2006.01)

(52) U.S. Cl.
CPC ...... *H04N 5/23222* (2013.01); *H04N 5/23216* (2013.01); *H04N 5/23293* (2013.01); *H04N 5/23296* (2013.01); *H04N 5/23206* (2013.01)

(58) Field of Classification Search
CPC ............... H04N 5/23222; H04N 5/23216; H04N 5/23293; H04N 5/23296
See application file for complete search history.

(56) References Cited

U.S. PATENT DOCUMENTS

| | | | | |
|---|---|---|---|---|
| 5,266,985 A * | 11/1993 | Takagi | .......................... | 396/147 |
| 7,321,391 B2 * | 1/2008 | Ishige | .......................... | 348/239 |
| 7,623,733 B2 * | 11/2009 | Hirosawa | ...................... | 382/284 |
| 7,855,737 B2 * | 12/2010 | Petrescu et al. | ............. | 348/239 |
| 8,194,140 B2 * | 6/2012 | Suzuki | ...................... | 348/208.16 |
| 8,228,399 B2 * | 7/2012 | Hwang et al. | ........... | 348/231.99 |
| 2001/0048815 A1 * | 12/2001 | Nakajima et al. | ............. | 396/310 |
| 2006/0158534 A1 * | 7/2006 | Gotohda | ...................... | 348/239 |
| 2007/0002157 A1 * | 1/2007 | Shintani et al. | ......... | 348/333.06 |
| 2008/0129842 A1 * | 6/2008 | Shibutani | ................ | 348/231.99 |
| 2009/0015702 A1 * | 1/2009 | Garcia Alonso | ........ | 348/333.02 |
| 2009/0256933 A1 * | 10/2009 | Mizukami | .................. | 348/240.1 |
| 2010/0141781 A1 * | 6/2010 | Lu | .............................. | 348/222.1 |
| 2010/0157128 A1 * | 6/2010 | Choi et al. | ............... | 348/333.03 |
| 2010/0231741 A1 * | 9/2010 | Suzuki | ....................... | 348/222.1 |
| 2011/0008036 A1 * | 1/2011 | Takatsuka et al. | ........... | 396/283 |
| 2012/0133816 A1 * | 5/2012 | Imai | ........................ | 348/333.03 |
| 2013/0038759 A1 * | 2/2013 | Jo et al. | .................. | 348/240.99 |
| 2013/0258159 A1 * | 10/2013 | Sakane | .................... | 348/333.02 |
| 2014/0181745 A1 * | 6/2014 | Cui | .............................. | 715/835 |

FOREIGN PATENT DOCUMENTS

JP     2010-141609 A     6/2010

* cited by examiner

*Primary Examiner* — Daniel M Pasiewicz
(74) *Attorney, Agent, or Firm* — Cha & Reiter, LLC

(57) ABSTRACT

The present disclosure provides a method and mobile terminal apparatus for displaying a specialized guide image over a preview image, which facilitates communication and capture of a desired photographic composition. A preview image is displayed on a screen. A guide request is detected and, in response, a background guide image is automatically generated from a frame of the preview image. The background guide image is displayed over the preview image.

14 Claims, 9 Drawing Sheets

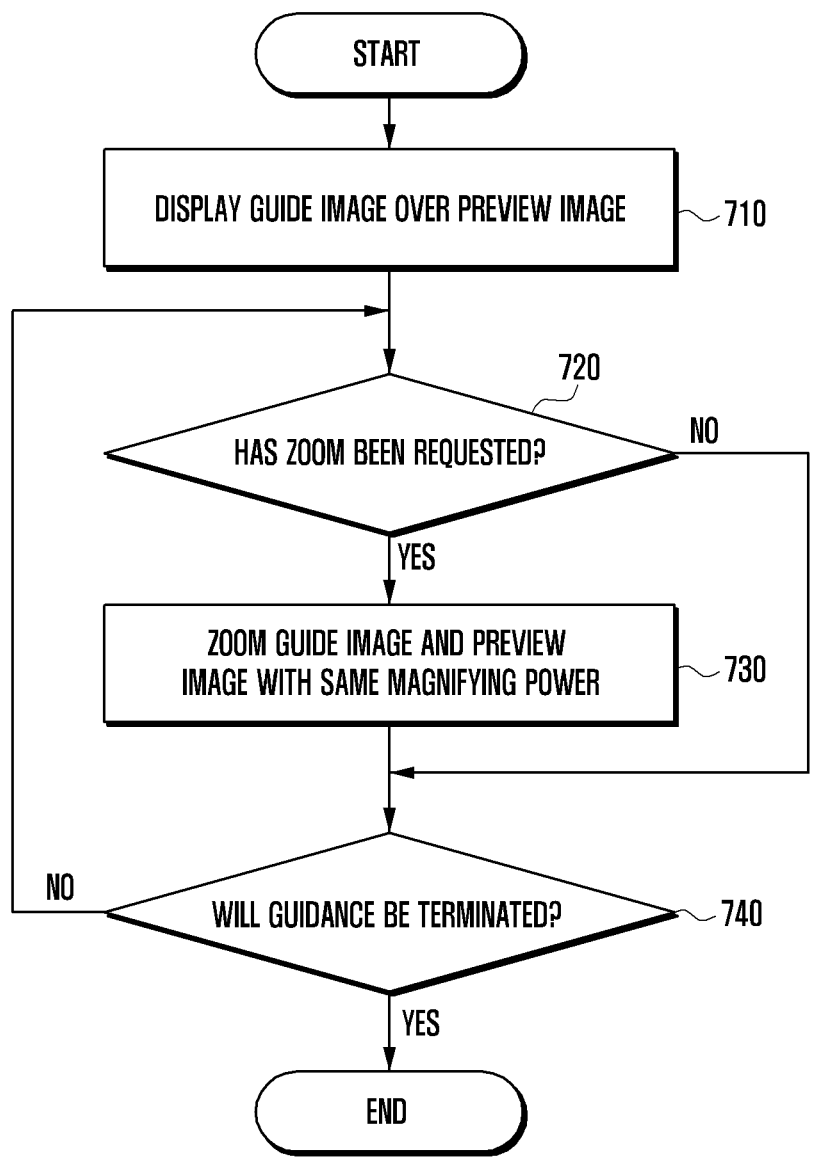

METHOD AND MOBILE TERMINAL APPARATUS FOR DISPLAYING SPECIALIZED VISUAL GUIDES FOR PHOTOGRAPHY

CLAIM OF PRIORITY

This application claims priority under 35 U.S.C. §119(a) of a Korean patent application filed on Feb. 8, 2013 in the Korean Intellectual Property Office and assigned Serial No. 10-2013-0014491, the entire disclosure of which is hereby incorporated by reference.

BACKGROUND

1. Technical Field

The present disclosure relates to a method and mobile terminal apparatus for displaying specialized visual guides that enable communication and capture of particular photographic compositions.

2. Description of Related Art

Mobile terminals, such as smart phones, are generally equipped with a camera. When the mobile terminal is ready to capture an image, the mobile terminal processes frames generated by the camera, and displays a preview image on a preview screen. In this state, when a shutter event from an input unit is detected, a frame corresponding to the preview image is compressed and stored. In other words, users can take pictures having a desired composition by referencing the preview image. However, there is no way to accurately communicate the desired composition of a picture to another user. Other users may therefore fail to capture images having the desired composition.

SUMMARY

The present disclosure provides a method and mobile terminal apparatus for displaying a specialized guide image over a preview image, which facilitates communication and capture of a desired photographic composition.

In accordance with one aspect of this disclosure, a method for displaying a specialized guide image over a preview image is disclosed, which facilitates communication and capture of a desired photographic composition. A preview image is displayed on a screen. A guide request is detected and, in response, a background guide image is automatically generated from a frame of the preview image. The background guide image is displayed over the preview image.

In accordance with another aspect of this disclosure, a mobile terminal apparatus for facilitating communication and capture of a desired photographic composition includes a camera, a display unit, an input unit for receiving input information, a control unit having a computer processor, the control unit controlling the camera and the display unit in response to input information received from the input unit, and memory comprising program instructions. The program instructions are executable by the control unit to display a preview image provided by the camera on the display unit, detect a guide request event generated from the input unit during the display of the preview image, generate a background guide image using a frame of the preview image in response to the guide request event, and display the background guide image over the preview image.

BRIEF DESCRIPTION OF THE DRAWINGS

The above and other aspects, features and advantages of the present invention will be more apparent from the following detailed description, taken in conjunction with the accompanying drawings, in which:

FIG. 7 is a flowchart illustrating an example sequence of steps for implementing a zoom function while utilizing a guide image in accordance with one embodiment of the present disclosure;

DETAILED DESCRIPTION

In the following disclosure, a "mobile terminal" may be construed as a portable electronic device having a camera, and can be, for example, a smart phone, a tablet PC, a notebook PC, a digital camera, etc. The terms or words used hereinafter should not be construed as having common or dictionary meanings, but should be understood as having meanings and concepts that comply with the technical spirit of this disclosure. Accordingly, the following description and drawings illustrate only example embodiments of this disclosure, and do not represent the entire technical spirit of this disclosure. It should be understood that a variety of equivalents and modifications capable of replacing the embodiments may exist at the time of filing of this application. Furthermore, in the accompanying drawings, some elements are illustrated as being enlarged and are illustrated schematically, and the size of each element does not accurately reflect its real size. Accordingly, this disclosure is not restricted by the relative sizes or intervals that are depicted in the figures. Additionally, a detailed description of known functions or constructions related to this disclosure will be omitted if it is deemed that such description would make the gist of this disclosure unnecessarily vague.

Figure 1:
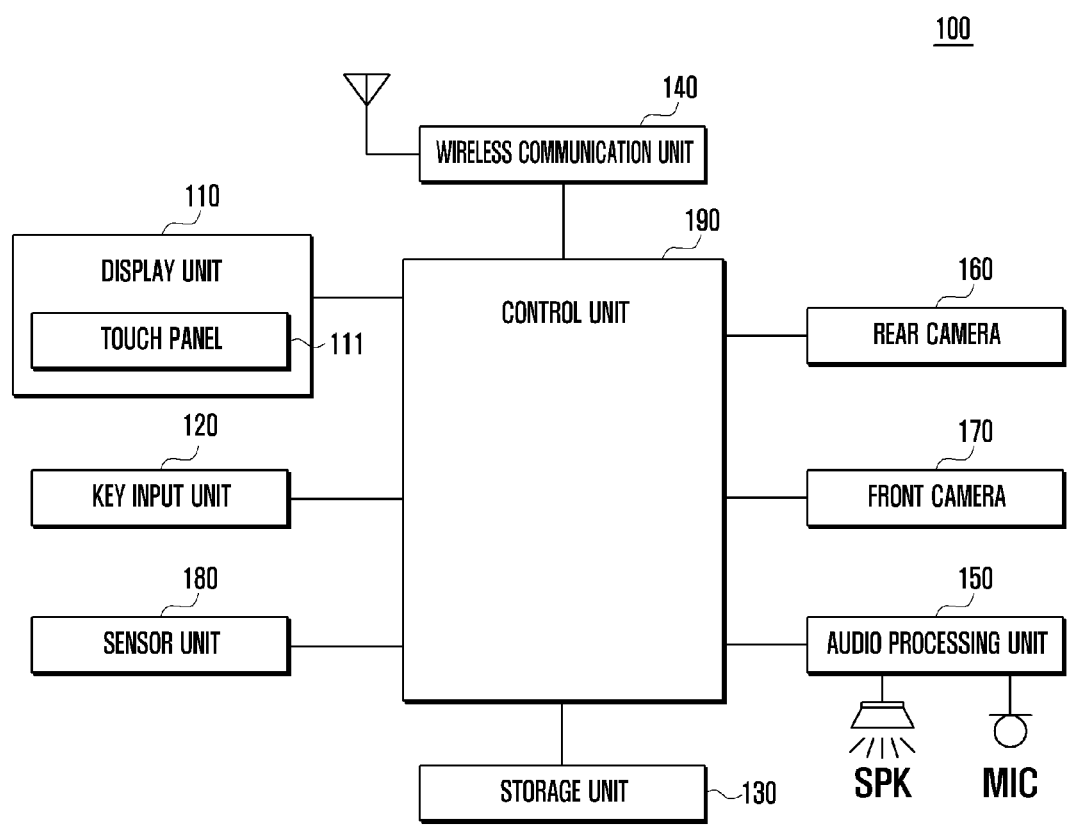
FIG. 1 is a functional block diagram illustrating a mobile terminal according to one embodiment of the present disclosure.

FIG. 1 is a functional block diagram illustrating a mobile terminal according to one embodiment of the present disclosure. The mobile terminal 100 may include a display unit 110, a key input unit 120, a storage unit 130, a wireless communication unit 140, an audio processing unit 150, a speaker SPK, a microphone MIC, a rear camera 160, a front camera 170, a sensor unit 180, and a control unit 190.

The display unit 110 displays data on a screen under the control of the control unit 190. That is, when the control unit 190 processes (e.g., decodes) data and stores the processed data in a buffer, the display unit 110 converts the data stored in the buffer into an analog signal and displays the converted signal on a screen. When power is supplied to the display unit 110, the display unit 110 displays a locked image on a screen. When unlocking information is detected in the state in which the locked image is displayed, the control unit 190 releases the lock. That is, the display unit 110 displays, for example, a home screen image instead of the locked image under the control of the control unit 190. The home screen image preferably includes a background image (e.g., photograph set by a user) and a plurality of icons displayed on the background image. Here, the icons indicate respective applications or respective pieces of content (e.g., photo files, video files, recording files, documents, and messages). When the camera icon is selected by a user, the control unit 190 preferably executes the selected camera application. During execution of the camera application, the display unit 110 preferably receives a preview image from the control unit 190, converts the preview image into an analog signal, and outputs the converted signal for display on a display screen. Furthermore, the display unit 110 may display a menu that includes control icons for the useable functions of the camera 160 or 170. The menu control icons may be displayed over the preview image. User interaction with the menu control icons may trigger correlating functions of the camera 160 or 170. For example, this menu preferably includes a shutter control icon. User manipulation of the shutter control icon may trigger the shutter function of the camera, capturing an image.

The display unit 110 displays images on a screen, as directed by the control unit 190. For example, when the camera application is being used, the display unit 110 can display a preview image captured by the rear camera 160 on the screen, and display a guide image layered on top of the preview image. In one embodiment, the guide image may be displayed semi-transparently. The display unit 110 may be implemented utilizing, for example, a Liquid Crystal Display (LCD), Organic Light Emitted Diodes (OLED), Active Matrix Organic Light Emitted Diodes (AMOLED), or a flexible display.

A touch panel 111 is preferably installed in a screen of the display unit 110. Specifically, the touch panel 111 may be an "add-on" type, in which the touch panel 111 is placed in a screen of the display unit 110, or an "on-cell" type or an "in-cell" type, in which the touch panel 111 is inserted into the display unit 110. Other touchscreen technologies may be substituted or utilized as required.

The touch panel 111 preferably generates an analog signal (e.g., a touch event signal) in response to a gesture of a user, converts the analog signal into a digital signal, and transfers the digital signal to the control unit 190. Here, the touch event includes touch coordinates (x, y). For example, the touch Integrated Circuit ("IC") of the touch panel 111 can determine representative touch coordinates from among a plurality of touch coordinates and transfer the determined touch coordinates to the control unit 190. This control may be performed by the control unit 190.

The touch coordinates may be represented in pixels-based units. For example, if a screen has a resolution of 640 (i.e., the number of pixels in length)*480 (i.e., the number of pixels in breadth), X-axis coordinates may consist of the range of 0 to 640, and Y-axis coordinates may consist of the range from 0 to 480.

The control unit 190 may determine that a touch input means (e.g., a finger or pen) has touched the touch panel 111 when touch coordinates are received from the touch panel 111. Similarly, the control unit 190 may determine that the touch input means has been released from the touch panel 111 when touch coordinates cease to be received from the touch panel 111. Furthermore, if touched coordinates are changed, for example, from (x0, y0) to (x1, y2) and the amount of change (e.g., $D(D^2=(x0-x1)^2+(y0-y1)^2)$) exceeds a predetermined movement threshold (e.g., 1 mm), the control unit 190 may determine that the touch input means has been moved. In response to the movement of the touch input means, the control unit 190 may calculate both the change in the location (dx, dy) of the touch input means, and the transfer speed of the touch input means.

The control unit 190 may determine a user gesture as one of a touch, a multi-touch, a tap, a double tap, a long tap, a tap & touch, a drag, a flick, a press, a "pinch in," and a "pinch out" based on the touch coordinates, whether or not a touch of the touch input means has been released, whether or not the touch input means has been moved, a change in the location of the touch input means, and a transfer speed of the touch input means.

A "touch" may be defined as a gesture in which a user touches any one point of the touch panel 111 on a screen using the touch input means. A "multi-touch" may be defined as a gesture in which a user touches several points of the touch panel 111 on a screen using a plurality of touch input means (e.g., multiple fingers, such as the thumb and the index finger simultaneously). The "tap" is a gesture in which a user touches any one point on a screen using the touch input means and terminates the touch from the point without any movement. The "double tap" is a gesture in which a user taps any one point on a screen consecutively twice using the touch input means. The "long tap" is a gesture in which a user touches any one point on a screen relatively longer than a tap using the touch input means and terminates the touch from the point without any movement. The "tap & touch" is a gesture in which a user taps any one point on a screen and then touches the point for a specific time (e.g., 0.5 second). The "drag" is a gesture in which a user moves the touch input means in a specific direction in the state in which the user has touched any one point on a screen. The "flick" is a gesture in which a user moves the touch input means faster than the drag and then terminates the touch. The "press" is a gesture in which a user touches any one point on a screen and maintains the touch for a specific time (e.g., 2 seconds) or longer. The "pinch in" is a gesture in which a user touches two points on a screen at the same time using two touch input means and then narrows the interval between the two touch input means. The "pinch out" is a gesture in which a user touches two points on a screen at the same time using two touch input means and then widens the interval between the two touch input means. That is, "touch input" may be defined as contact with the touch panel 111, and other touch "gestures" may be defined as dynamic changes in touch inputs.

The touch panel 111 may be a complex touch panel that includes a "hand" touch panel for sensing inputs from contact with the human body (such as a finger) and a "pen" touch panel for sensing inputs from styli. The hand touch panel may be implemented as a capacitive-type touch panel. However, in other embodiments, the hand touch panel may also be implemented as a resistive-type, an infrared-type, or an ultrasonic-type touch panel. Furthermore, the hand touch panel is preferably not limited to generating a touch event in response to a hand gesture only, but may also generate a touch event in response to contact from other objects (e.g., an object made of conductive material and capable of causing a change in capacitance).

The pen touch panel may be implemented as an electromagnetic induction-type touch panel. In such an embodiment, the pen touch panel may generate a touch event in response to a touch pen (such as a stylus) that is specially manufactured to form a magnetic field. A touch event generated from the pen touch panel would preferably include touch coordinates and a value that is indicative of the type of touch. For example, when a certain first voltage level value is received from the pen touch panel, the control unit 190 may determine based on the received voltage level that a touch on the touch input means is an indirect touch (also called "hovering"). In another example, when a second voltage level value higher than the first voltage level value is received from the touch panel 111, the control unit 190 may determine that a touch on the touch input means is a direct touch. A touch event generated from the pen touch panel may further include a value indicating whether or not a button installed in a pen has been pressed. When the button installed in the pen is pressed, a magnetic field generated from the coil of the pen may be changed. The pen touch panel may generate a third voltage level value in response to a change in the magnetic field and transfer the third voltage level value to the control unit 190.

The key input unit 120 may include a plurality of keys for receiving numerical or alphabetic information and configuring various functions. The keys may include a menu import key, a screen on/off key, a power on/off key, and a volume control key. The key input unit 120 may generate a key event that is related to a user setting or configuration of a function of the mobile terminal 100, and transfer the key event to the control unit 190. The key event may include a power on/off event, a volume control event, a screen on/off event, or a shutter event. The control unit 190 executes or triggers the appropriate event or element in response to the key event. The keys of the key input unit 120 may be referred to as "hard" keys, and the virtual keys displayed on the display unit 110 may be referred to as "soft" keys.

The storage unit 130 may take the form of a disk, RAM, ROM, or flash memory, etc. The storage unit 130 preferably stores data that has been generated from the mobile terminal 100 and/or received from an external device (e.g., server, desktop PC, or tablet PC) through the wireless communication unit 140 according to instructions received from the control unit 190. Furthermore, the storage unit 130 may temporarily store data received from messages, photographs, web pages, and documents (e.g., copy and paste data). Furthermore, the storage unit 130 may store various setting and configuration values (e.g., screen brightness, information about whether or not to vibrate when a touch occurs, and information about whether or not to automatically rotate a screen) for operating the mobile terminal 100.

The storage unit 130 preferably stores a boot program and one or more operating systems and applications. The operating system may function as an interface between hardware and software applications, as a coordinator between disparate software applications, and generally manages computer resources, such as the central processing unit ("CPU"), graphics processing unit ("GPU"), main memory unit, and the storage unit 130. Applications may be divided into embedded applications, which are pre-installed in the mobile terminal and are generally not removable, and third-party applications, which are installed in the mobile terminal by end-users, and are generally less critical to the core functions of the mobile terminal. Examples of the embedded applications include a web browser, an e-mail program, and an instant messenger. When power is supplied to the battery of the control unit 190, the boot program is preferably first loaded onto the main memory unit of the control unit 190. The boot program loads the operating system onto the main memory unit. The operating system may then load applications onto the main memory unit.

The wireless communication unit 140, together with an external device, preferably performs a voice call, a video call, or data communication over a network according to instructions received from the control unit 190. The wireless communication unit 140 may include a radio frequency transmitter, for performing up-conversion and amplification on a frequency of a transmitted signal, and a radio frequency receiver, for performing low-noise amplification and down-conversion on a frequency of a received signal. The wireless communication unit 140 further includes a mobile communication module (e.g. 3rd-generation mobile communication module, 3.5-generation mobile communication module, or 4th-generation mobile communication module), a digital broadcasting module (e.g. DMB module), and short-range communication modules (e.g. a "Wi-Fi" module, a "Bluetooth" module, or a Near Field Communication ("NFC") module).

The audio processing unit 150 may enable input and output of an audio signal (e.g., voice data) for voice recognition, voice recording, digital recording, and a call in coordination with the speaker SPK and the microphone MIC. The audio processing unit 150 may receive an audio signal to be outputted from the control unit 190, perform digital-to-analog conversion on the received audio signal, amplify the analog signal, and output the amplified signal to the speaker SPK, whereupon user may hear the analog signal. In another example, the audio processing unit 150 preferably performs analog-to-digital conversion on an audio signal to be outputted received from the microphone MIC. The converted signal may be forwarded to the control unit 190. The control unit 190 may in turn forward the converted signal to the speaker SPK, which may convert and output the analog audio signal as sound waves. The microphone MIC preferably converts sound waves, received from a person or other sound sources, into an audio signal.

The rear (i.e., the face opposite the display unit 110) camera 160 and the front (i.e., the same face as the display unit 110) camera 170 may be provided for photographing objects and outputting corresponding pictures to the control unit 190. Specifically, each camera 160 and 170 preferably includes a lens for concentrating rays of light, an image sensor for converting the light into an electrical signal, and an Image Signal Processor ("ISP") for processing the electrical signal, received from the image sensor, in the form of a frame (i.e., raw data).

The ISP can resize a frame waiting in the buffer (called a "queue") of the ISP to the size of a preview image. In general, the ISP may reduce the frame to the size of a screen of the display unit 110. Furthermore, the ISP preferably outputs a preview image to the control unit 190. In response, the control unit 190 may instruct the display unit 110 such that the preview image is displayed on the screen of the display unit 110. In another embodiment, this resizing may be performed by the control unit 190. For example, the camera 160 or 170 may transfer a frame to the buffer of an Application Processor ("AP"), and the AP may process the frame into the form of a preview image, outputting the preview image to the display unit 110.

The ISP may compress a frame that is waiting in the buffer into a compressed image (e.g., JPEG) and output the compressed image to the control unit 190. In an alternative embodiment, this compression may be performed by, for example, the AP. The control unit 190 may detect a shutter event (e.g., an event generated when a user taps the shutter button displayed on the display unit 110) from the touch panel 111 or the key input unit 120 and preferably stores a compressed image in the storage unit 130 in response to the shutter event.

Meanwhile, the camera may include other elements (e.g., body tube and motor) for controlling the distance (i.e., focal distance) between the lens and the image sensor. In one example, the control unit 190 may facilitate an optical zoom function by controlling the relevant mechanisms of the rear camera 160. Furthermore, the control unit 190 may facilitate a digital zoom that enlarges a portion of a preview image. Digital zoom allows for the use of a zoom function using software only, but the picture quality is degraded because the zoom merely selects a portion of a preview image for enlargement and display. Hereinafter, in this disclosure, "zoom" may refer to either digital zoom or optical zoom.

The sensor unit 180 preferably senses physical quantities (e.g., acceleration, pressure, and the intensity of radiation) or a change in physical quantities, generates sensing information (e.g., a change of voltage nv), and transfers the sensing information to the control unit 190. The sensor unit 180 may include an acceleration sensor, an illuminance sensor, and a proximity sensor. The sensors may be integrated into one computing chip, or can be implemented in a plurality of differing computing chips.

The control unit 190 preferably controls the overall operation of the mobile terminal 100, coordinates the flow of signals between the internal elements of the mobile terminal 100, processes data, and manages the supply of power from the battery to the elements.

The control unit 190 includes one or more CPUs. As is well-known, the CPU is the core control unit of a computer system for performing operations on and comparing data, interpreting and executing commands, etc. The CPU includes various types of registers for temporarily storing data or commands. The control unit 190 may include one or more GPUs. The GPU is a graphic control unit for performing operations on and comparing data related to graphics, interpreting and executing commands, etc. instead of the CPU. Each of the CPU and the GPU can be integrated into a single package in which two or more independent cores (e.g., quad-core) are integrated into a single IC. That is, the CPUs may be integrated into one multi-core processor, and a plurality of the GPUs may also be integrated into one multi-core processor. Furthermore, the CPU and the GPU may be integrated into one chip (i.e., a "System on a Chip," or "SoC"). Furthermore, the CPU and the GPU may be packaged into a multi-layer format. The AP may also include the CPU and the GPU. The AP may further include the ISP.

The control unit 190 preferably includes a main memory unit, which may take the form of random-access memory, or "RAM." The main memory unit may stores various programs ready for execution, or currently being executed. Such programs may include, for example, a boot program, operating systems, and applications loaded from the storage unit 130. In short, the control unit 190 (e.g., the AP) may access a program, interpret the command of the program, and execute a function (e.g., photography guidance) based on the result of the interpretation. Furthermore, the control unit 190 may include cache memory for temporarily storing data to be written into the storage unit 130, and temporarily storing data read from the storage unit 130.

The mobile terminal 100 may further include elements not described above, such as an earphone jack, a Global Positioning System (GPS) module, a vibration motor, and accessories. The accessories of the mobile terminal 100 are preferably separable from the mobile terminal 100. For example, one of the accessories may include a stylus pen for performing touch inputs.

Figure 2:
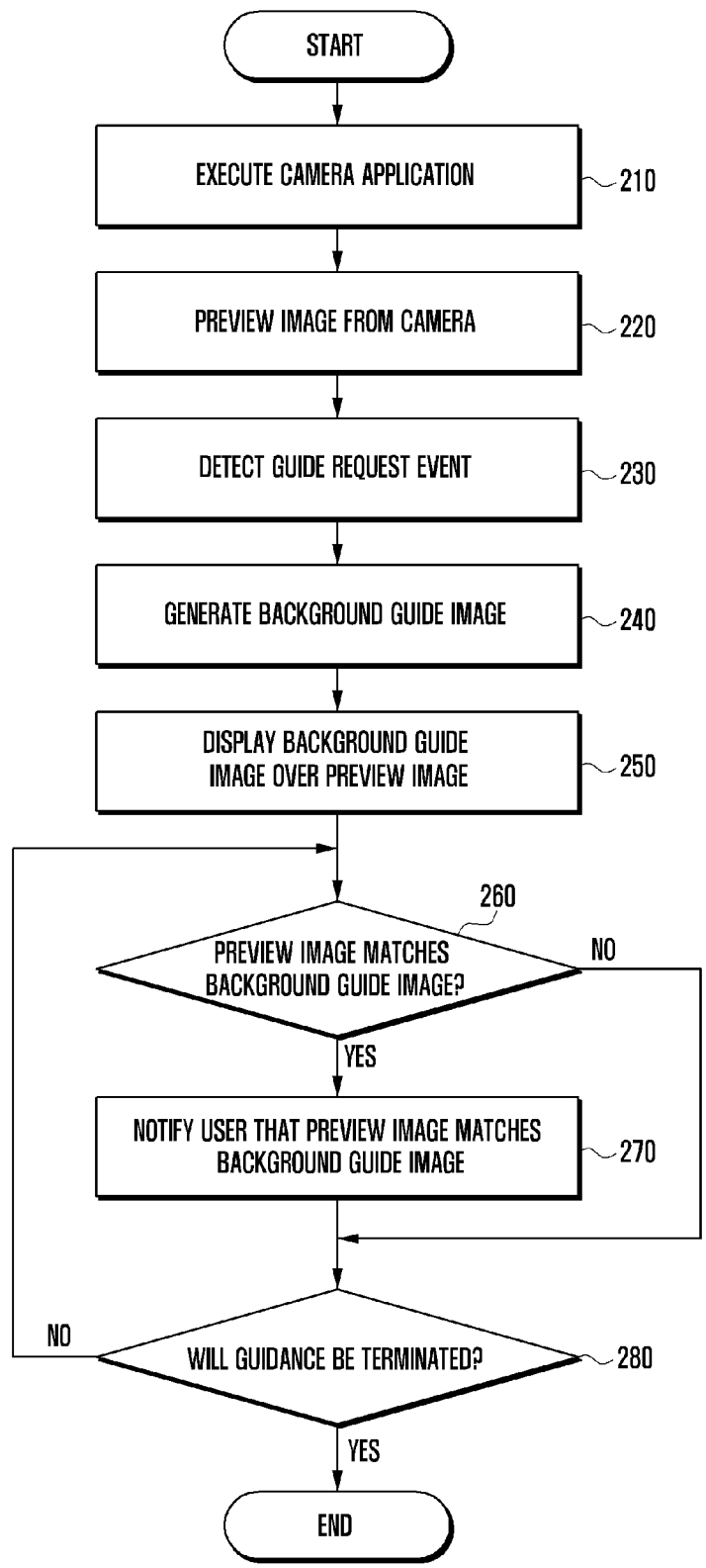
FIG. 2 is a flowchart illustrating an example sequence of steps for providing a guide image in accordance with one embodiment of the present disclosure.

FIG. 2 is a flowchart illustrating a sequence of steps for providing a guide image in accordance with one embodiment of the present disclosure. The following description of FIG. 2 also makes reference to FIG. 3, which is an illustration showing an example guide image displayed over a preview image in accordance with one embodiment of the present disclosure.

Referring to FIG. 2, when an icon corresponding to the camera application is selected by a user, the control unit 190 executes the camera application at step 210. As a result of the execution, the control unit 190 directs the display unit 110 to preview an image provided by the rear camera 160 on the screen at step 220. For example, the rear camera 160 may generate a frame, resize the frame in the form of an image for the preview, and transfer the resized image to the control unit 190. Alternatively, in another embodiment, this resizing may be performed by the control unit 190. In either case, the control unit 190 then transfers the resized image to the display unit 110 for display, previewing for the user the resized image corresponding to the current field of vision of the camera.

Figure 3:
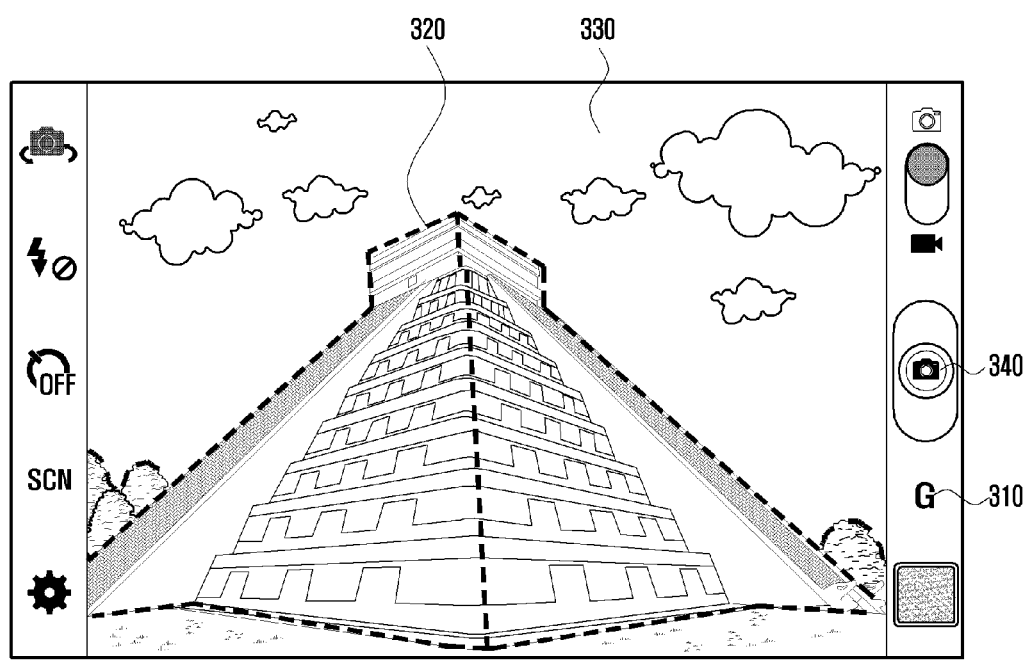
FIG. 3 is an illustration showing an example guide image displayed over a preview image in accordance with one embodiment of the present disclosure.

In step 230, the control unit 190 may detect a guide request event. Referring now to FIG. 3, a guide request event may be, for example, a tap touch input on a guide button "G" 310. The selection of "G" 310 preferably generates a request event from the touch panel. In response to the request event, the control unit 190 may generate a background guide image 320 (as depicted in FIG. 3) in step 240. For example, the AP of the control unit 190 may generate the background guide image 320 in response to the request event, and instruct the ISP of the rear camera 160 to generate the background guide image using a frame (i.e., raw data) that is waiting in the buffer to be previewed or compressed. The ISP is preferably capable of recognizing representative division regions (e.g., mountains, the sea, buildings, and people) in the frame, and extracting the feature information (e.g., a boundary line between the representative division regions) from the representative division regions. A plurality of solutions and processes for this recognition and extraction are already widely known in the image processing field, and a detailed description thereof is omitted. The ISP preferably transfers the generated background guide image (which may constitute the feature information) to the AP.

The control unit 190 may then buffer the generated background guide image (i.e. the control unit 190 temporarily stores the generated background guide image in, for example, the main memory unit). Next, in step 250, the control unit 190 may instruct the display unit 110 to display the background guide image 320 over a preview image 330, as shown in FIG. 3. The user of the mobile terminal 100 may confirm that the background guide image 320 has been displayed, and then request another person to photograph the desired composition by matching the preview image scene with the background guide image.

In step 260, the control unit 190 may determine whether or not the preview image matches the background guide image. For example, the control unit 190 may extract feature information from a frame that waits in the buffer. If the extracted feature information matches feature information correlating to the background guide image 320, the control unit 190 may determine (within some predefined threshold) that the preview image 330 substantially matches the background guide image 320. When the preview image 330 matches the background guide image 320, the control unit 190 preferably notifies the user that the preview image 330 matches the background guide image 320 at operation 270. Notification may be conducted in a manner of ways. In one embodiment, the control unit 190 may cause the display unit 110 to alter the color of the background guide image 320. In another embodiment, the control unit 190 may cause the display unit 110 to display an icon indicative of the match. A photographer may then capture an image with reference to this guide. In step 280, the control unit 190 may determine whether or not to terminate the guide. For example, when a tap on the shutter button 340 (of FIG. 3) is detected, the control unit 190 preferably compresses the frame (i.e., raw data) that is waiting in the buffer, and stores the compressed image in the storage unit 130. The control unit 190 may then terminate the display of the background guide image 320.

Figure 4:
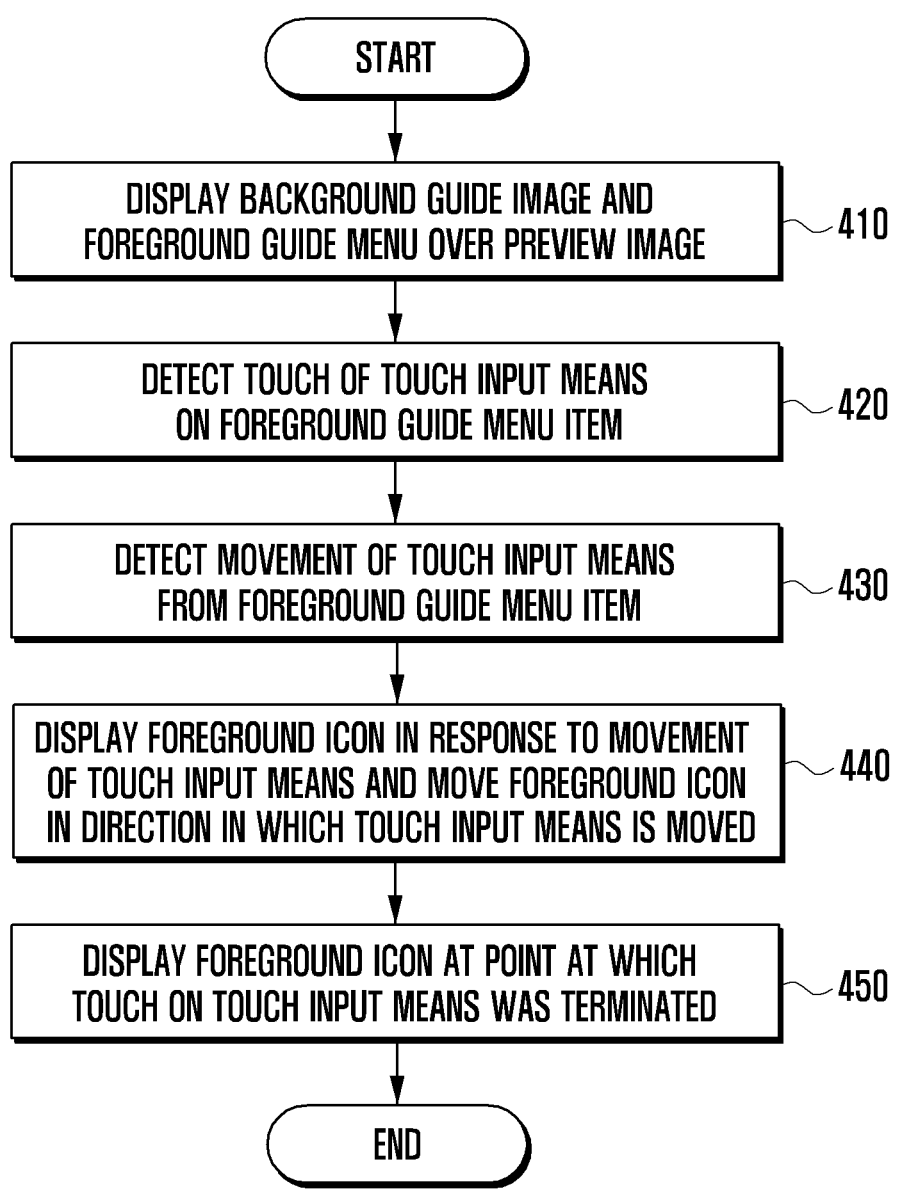
FIG. 4 is a flowchart illustrating an example sequence of steps for configuring a guide image in accordance with one embodiment of the present disclosure.

FIG. 4 is a flowchart illustrating a sequence of steps for configuring a guide image in accordance with one embodiment of the present disclosure. The following description of FIG. 4 makes reference to FIGS. 5 and 6, both of which are illustrations showing manual configuration of a guide image in accordance with one embodiment of the present disclosure.

Figure 5:
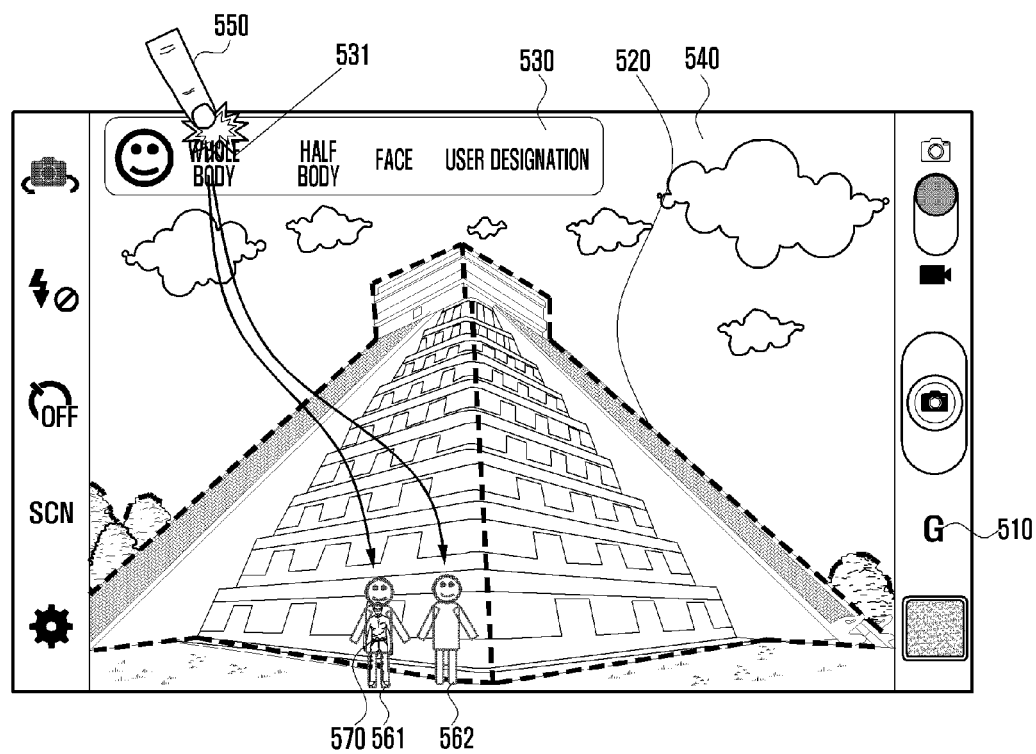
FIG. 5 is an illustration showing manual configuration of a guide image in accordance with one embodiment of the present disclosure.

Besides generating a background guide image, the present invention may also be used to display foreground icons representing foreground elements in the desired photographic composition. For example, foreground icons representing people may be superimposed on the preview image to instruct a user as to the configuration of the desired photograph. The foreground icons are preferably moveable and scalable to achieve sufficient flexibility as to allow for representation of a broad range of desired photograph compositions. Referring now to FIG. 5, when a tap on a guide button "G" 510 is detected, the control unit 190 may generate the background guide image 520 and instruct the display unit 110 to display the foreground guide menu 530, together with the background guide image 520, both of which are displayed over the preview image 540.

In step 420, the control unit 190 may detect a touch on any one of the items included in the foreground guide menu 530 using a touch input means 550 (e.g., a contact from a finger or a stylus pen). In step 430, the control unit 190 may detect movement of the touch input means from the touched foreground guide menu 530. In step 440, in response to the movement of the touch input means 550, the control unit 190 may instruct the display unit 110 to display a foreground icon 570 over the preview image 540 and to move the foreground icon in the direction in which the touch input means 550 is moved. That is, the display unit 110 may display the foreground icon that appears in the touched item, and then move the foreground icon along the path along which the touch input means 550 moves. In step 450, when inputs from the touch input means 550 are terminated (e.g., the finger or stylus is moved away from the touchscreen), the control unit 190 may instruct the display unit 110 to display the foreground icon in the location where the foreground icon was positioned at the time in which the touch was terminated.

The following description of FIG. 5 is made to better illustrate steps 420 to 45. Placement of the foreground icons may be done by a, for example, "drag and drop" operation. The whole body button 531 may toggle the inclusion of a full-body foreground icon. The whole body button 531 may be selected from among the items of the foreground guide menu 530 when it is touched by the touch input means 550. When the touch input means 550 moves, a displayed first whole body icon 561 is preferably removed from the whole body button 531 and moves along the path along which the touch input means 550 moves (represented by the lines from the whole body button 531 to the foreground icons 561 and 562. When the touch on the touch input means 550 is terminated, the first whole body icon 561 is affixed at the point at which the touch was terminated. Thereafter, when the whole body button 531 is touched by the touch input means 550 again, and the touch input means 550 is moved, a second whole body icon 562 is removed from the whole body button 531 and moves along the path along which the touch input means 550 moves. When the touch on the touch input means 550 is terminated, the second whole body icon 562 is placed at the point at which the touch was terminated. As described above, a user can create a foreground icon having a desired shape and "drag" it to the desired place.

Figure 6:
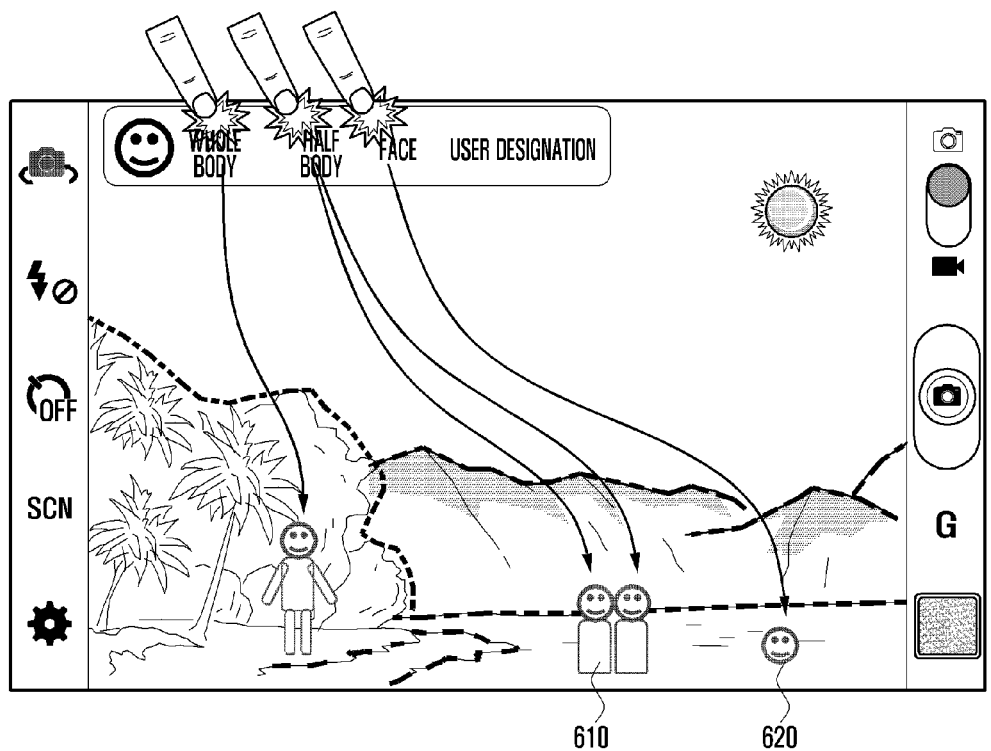
FIG. 6 is an illustration showing manual configuration of a guide image in accordance with one embodiment of the present disclosure.

As shown in FIG. 6, the icon can take the shape of a half body 610 or a face 620 rather than the whole body. For example, a close-up photograph may only show the head and part of the torso, in which case the foreground icon is preferably customizable to only show head and torso guides. In contrast, a more distant shot for capturing, for example, a landmark may require the use of a full-body foreground icon, as the full body of a person is anticipated to be captured in the photographic composition. Visual obstructions, such as water (as depicted in FIG. 6), may also alter the desired configuration of any particular foreground icon. Furthermore, the whole body icon can take the shape of an animal, a bicycle, etc. rather than that of a person. Thereafter, a user asking another to help him capture a particular photographic composition may request that the other person match the preview image (e.g., background) with the background guide image 520, match the positioning of human subjects and the user (i.e., the user of the mobile terminal 100, if he is to be included in the photograph) with the first whole body icon 561 and the second whole body icon 562, respectively, and then capture the resulting picture.

Additionally, the size of the foreground icon is preferably controllable in response to a gesture of a user. For example, when a pinch-in gesture is detected, the control unit 190 may alter the foreground icon so that an icon having a reduced size is displayed on the display unit 110. When a pinch-out gesture is detected, the control unit 190 may alter the foreground icon so that an icon having an increased size is displayed on the display unit 110.

FIG. 7 is a flowchart illustrating a sequence of steps for implementing a zoom function while utilizing a guide image in accordance with one embodiment of the present disclosure. The description of FIG. 7 makes reference to FIGS. 8A and 8B, which are illustrations showing a guide image before and after utilization of a zoom function in accordance with one embodiment of the present disclosure.

Figure 8A:
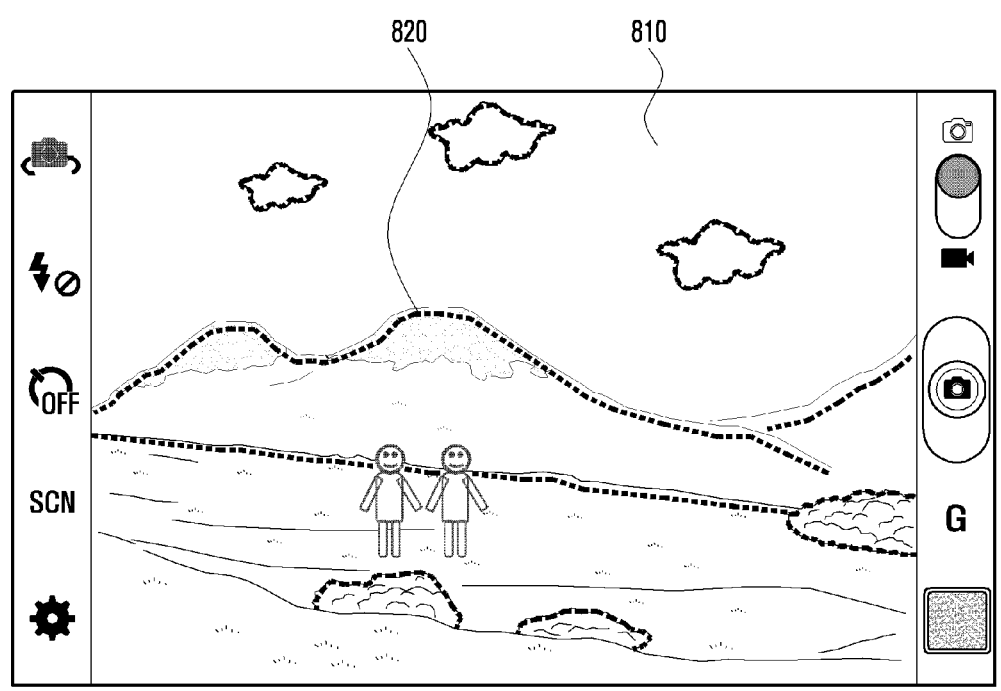
FIG. 8A is an illustration showing a guide image before utilization of a zoom function in accordance with one embodiment of the present disclosure.
Figure 8B:
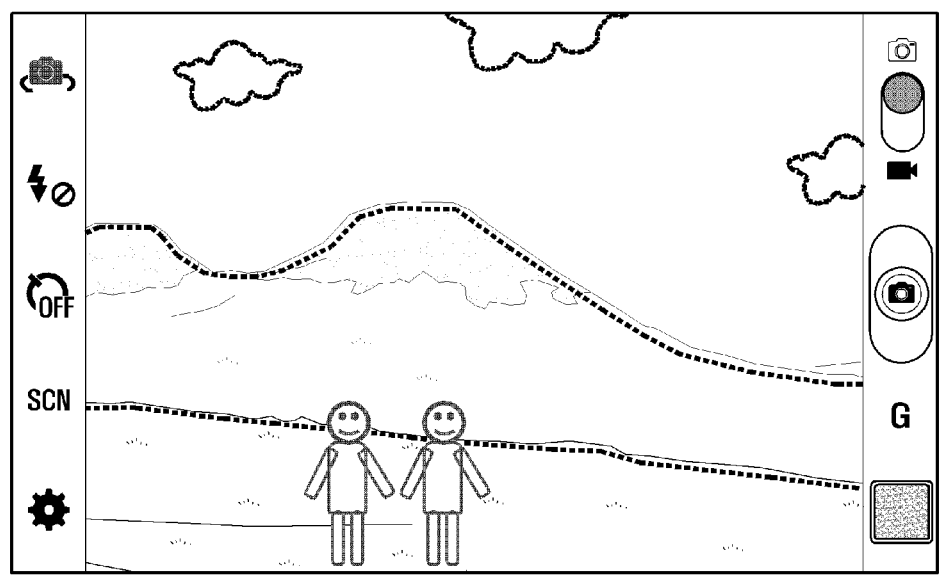
FIG. 8B is an illustration showing a guide image after utilization of a zoom function in accordance with one embodiment of the present disclosure.

Referring to FIGS. 7, 8A, and 8B, in step 710, the control unit 190 may instruct the display unit 110 to display a guide image (including a background guide image 820 and foreground icons) over a preview image 810. In step 720, the control unit 190 may determine whether or not a zoom request event (e.g., a pinch-in or pinch-out gesture for the preview image) is detected. If it is determined that a zoom request event has been detected, the control unit 190 may cause the preview image and the guide image to be enlarged with the same magnifying power (so that the preview image and guide image remain appropriately scaled to one another), and the zoomed preview image and guide images are displayed on the display screen in step 730. For example, if the preview image is enlarged from 100% to 120%, the guide image is also enlarged from 100% to 120% and displayed. If the preview image is reduced from 120% to 100%, the guide image is also reduced from 120% to 100% and displayed.

The following scenarios can be assumed. Referring to FIGS. 8A and 8B, if foreground objects (such as people) are very small relative to background objects (such as large landmarks, mountains, etc.), the photographer may inform the mobile terminal owner of this fact and query whether or not zoom should be used to acquire a better picture of the foreground objects. If the mobile terminal owner requests zoom-in, the photographer may pinch out the preview image 810. In response to the pinch out, the control unit 190 zooms in the preview image 810 and also zooms in a background guide image 820 with the same magnifying power, maintaining the relevant scale between the preview image 810 and the background guide image 820. In another example, if a foreground object (such as a person) is smaller than a foreground icon guide (such as a humanoid icon) displayed over the object, a photographer may zoom in on the preview image. In response thereto, a guide image is also preferably zoomed in. The zoom-in operation may be continued until the foreground object (the subject of the photograph) matches the size of the guide image.

In step 740, the control unit 190 may determine whether or not to terminate the guide. For example, when a tap on the shutter button is detected, the control unit 190 may compress a frame (i.e., raw data) waiting in the buffer and store the compressed image in the storage unit 130. Next, the control unit 190 may terminate the display of the guide image.

In accordance with the method and mobile terminal apparatus for displaying specialized visual guides, a guide image is displayed over a preview image, enabling a user to communicate a desired photographic composition to a photographer, and a photographer to capture the desired composition with reference to the displayed guide image.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for."

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for providing visual guides in a mobile terminal having a camera, the method comprising:
   displaying a preview image, provided by the camera, on a screen;
   detecting a guide request event generated from an input unit during the displaying of the preview image;
   in response to the guide request event, generating a background guide image from a frame of a preview image;
   displaying the generated background guide image over a preview image, the background guide image including at least one image tracing a silhouette of an object in the preview image;
   in response to a zoom request event generated from the input unit, performing a zoom-in operation including enlarging the background guide image including the at least one image to substantially match zoom-in enlargement of the preview image; and
   displaying the enlarged preview image and enlarged background guide image.

2. The method of claim 1, wherein displaying of the background guide image over the preview image comprises displaying a foreground guide menu over the preview image along with the background guide image in response to the guide request event, the foreground guide menu comprising at least one item.

3. The method of claim 2, further comprising:
   detecting a touch input on the item of the foreground guide menu;
   detecting a movement of the touch input from the item;
   in response to the movement of the touch input, displaying and moving a foreground icon corresponding to the item; and
   displaying the foreground icon at a point where the touch input was terminated.

4. The method of claim 3, further comprising:
   altering a size of the foreground icon; and
   displaying the foreground icon having the altered size.

5. The method of claim 1, further comprising displaying information indicating that the preview image has matched the background guide image, if the preview image matches the background guide image.

6. The method of claim 1, further comprising:
   automatically detecting large-scale structures in a field of view of the camera; and
   detecting one or more division areas for each large-scale structure and generating a boundary line between each of the one or more division areas to form at least one visual silhouette,
   wherein the background guide image includes the at least one visual silhouette for each of the large scale structures.

7. The method of claim 4, further comprising:
detecting a touch input specifying a configuration for the foreground icon;
altering the configuration of the foreground icon; and
displaying the foreground icon having the altered configuration.

8. A mobile terminal apparatus, comprising:
a camera;
a display unit;
an input unit for receiving input information;
memory comprising program instructions; and
at least one processor operatively coupled to memory and configured to:
control the display unit to display a preview image provided by the camera on the display unit,
detect a guide request event generated from the input unit during the displaying of the preview image,
generate a background guide image using a frame of a preview image in response to the guide request event,
control the display unit to display the background guide image over a preview image, the background guide image including at least one image tracing a silhouette of an object in the preview image,
in response to a zoom request event generated from the input unit, perform a zoom-in operation including enlarging the background guide image including the at least one image to substantially match zoom-in enlargement of the preview image, and
control the display unit to display the enlarged preview image and the enlarged background guide image.

9. The mobile terminal of claim 8, wherein the at least one processor further comprises controlling the display to display a foreground guide menu over the preview image in response to the guide request event, the foreground guide comprising at least one item.

10. The mobile terminal apparatus of claim 9, wherein the input unit comprises a touch panel installed in the display unit, the at least one processor further configured to:
detect a touch input on the item of the foreground guide menu;
detect a movement of the touch input from the item;
in response to the movement of the touch input, control the display unit to display movement of a foreground icon corresponding to the item; and
control the display unit to display the foreground icon at a point where the touch input was terminated.

11. The mobile terminal apparatus of claim 10, wherein the at least one processor is further configured to:
alter a size of the foreground icon; and
control the display unit to display the foreground icon having the altered size.

12. The mobile terminal apparatus of claim 8, wherein the at least one processor is further configured to:
control the display unit to display information indicating that the preview image has matched the background guide image, if the preview image matches the background guide image.

13. The mobile terminal apparatus of claim 8, wherein the at least one processor is further configured to:
automatically detect large-scale structures in a field of view of the camera; and
detect one or more division areas for each large-scale structure and generating a boundary line between each of the one or more division areas to form at least one visual silhouette,
wherein the background guide image includes the at least one visual silhouette for each of the large scale structures.

14. The mobile terminal apparatus of claim 10, wherein the at least one processor is further configured to:
detect a touch input specifying a configuration for the foreground icon;
alter the configuration of the foreground icon; and
control the display unit to display the foreground icon having the altered configuration.

\* \* \* \* \*